W. E. HART.
AUTOMOBILE SIGNAL DEVICE.
APPLICATION FILED MAR. 18, 1919.

1,315,185.

Patented Sept. 2, 1919.
3 SHEETS—SHEET 1.

INVENTOR
William E. Hart
BY
O. M. Vrooman
ATTORNEY

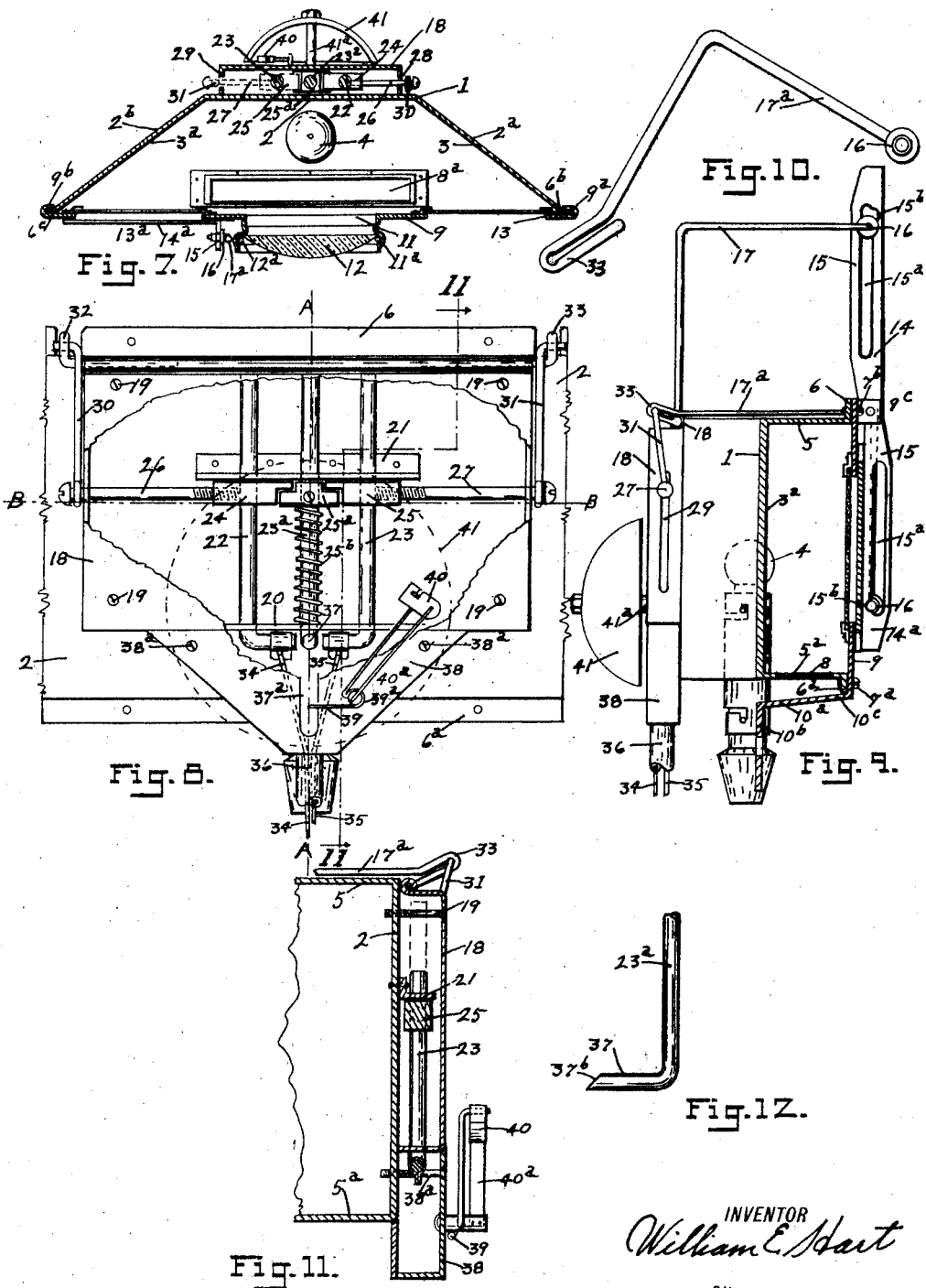

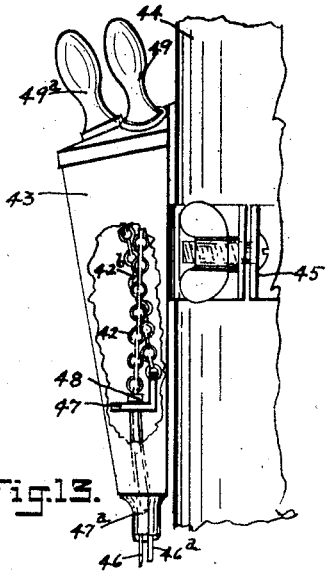
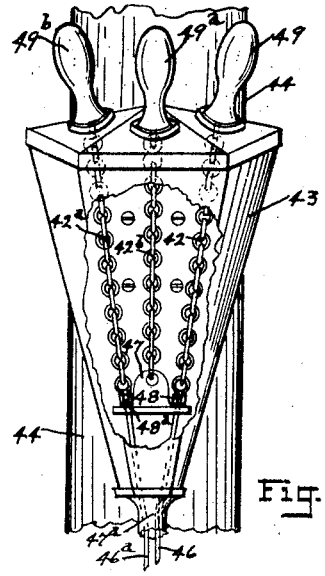
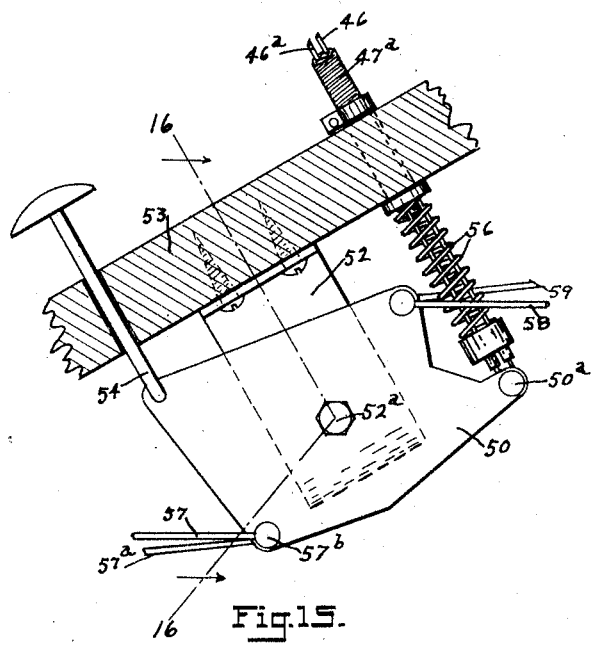
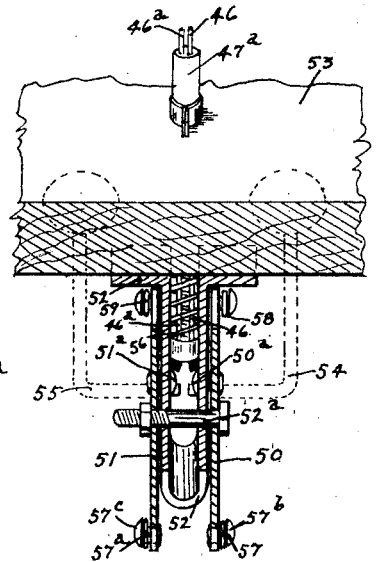

UNITED STATES PATENT OFFICE.

WILLIAM E. HART, OF SAN JOSE, CALIFORNIA.

AUTOMOBILE-SIGNAL DEVICE.

1,315,185.　　　　　　Specification of Letters Patent.　　Patented Sept. 2, 1919.

Application filed March 18, 1919. Serial No. 283,376.

*To all whom it may concern:*

Be it known that I, WILLIAM E. HART, a citizen of the United States, residing at San Jose, in the county of Santa Clara and State of California, have invented certain new and useful Improvements in Automobile-Signal Devices, of which the following is a specification.

My invention relates to improvements in automobile signal devices and more particularly to a signal lamp and direction indicator adapted to be supported on a vehicle, above the license number plate so as to illuminate said plate and which also may be used by the driver of the vehicle to signal, both audibly and visibly, to others, either day or night, that he intends to turn to the right, left, or stop, as the case may be. The primary object of my invention is to provide a signal device that is neat, compact and inexpensive to manufacture.

Another object of my invention is to provide a signal device that can be used in place of the customary tail-light now in use.

A further object of my invention is to generally improve this class of signal devices so as to increase their usefulness, durability and efficiency.

Further objects and advantages will appear in the following description and in the accompanying drawings forming a part of this specification, and then more particularly pointed out in the claims, it being understood that various changes in form, proportion and minor details of construction may be resorted to within the scope of the appended claims.

In the drawings similar reference characters represent corresponding parts in all the views.

Fig. 7 is an enlarged, longitudinal, sectional view as shown on line 7—7 of Fig. 2.

Fig. 8 is an elevation of the back of my device, enlarged, parts broken away, exposing the mechanism to view.

Fig. 9 is an enlarged sectional view as indicated on line 9—9 of Fig. 2.

Fig. 10 is a plan view of the flap actuating arm and roller.

Fig. 11 is a sectional view on line 11—11 of Fig. 8.

Fig. 12 is a plan view of the bell clapper trip.

Fig. 13 is a side elevation of the pull-chain case, attached to the steering post of an automobile, parts broken away.

Fig. 14 is a front elevation of Fig. 13, parts broken away.

Fig. 15 is a side view of the bell cranks and stanchion support, attached to the under side of the floor of an automobile, parts broken away.

Fig. 16 is a sectional view on line 16—16 of Fig. 15.

Figure 1:
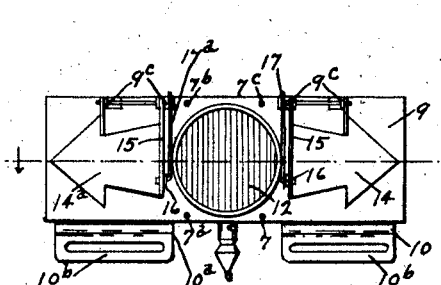
Figure 1 is a front elevation of my signal device, parts in their normal position.
Figure 2:
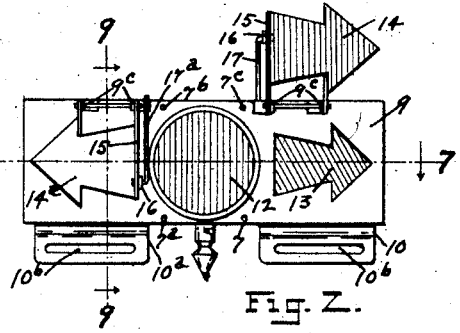
Fig. 2 is a front elevation of my signal device, showing the right signals exposed to view.
Figure 3:
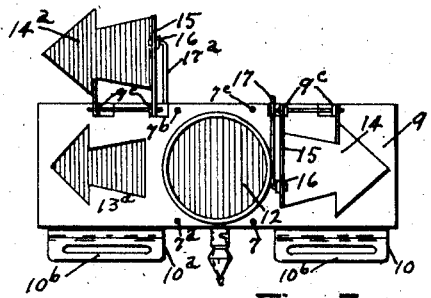
Fig. 3 is a front elevation of my signal device, showing the left signal exposed to view.
Figure 4:
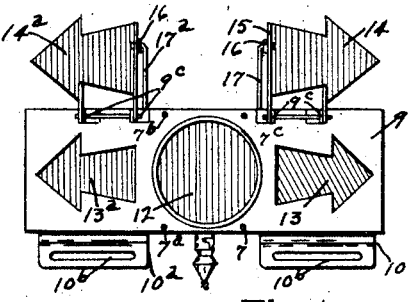
Fig. 4 is a front elevation of my signal device, showing both right and left signals displayed, denoting "stop".
Figures 5, 6:
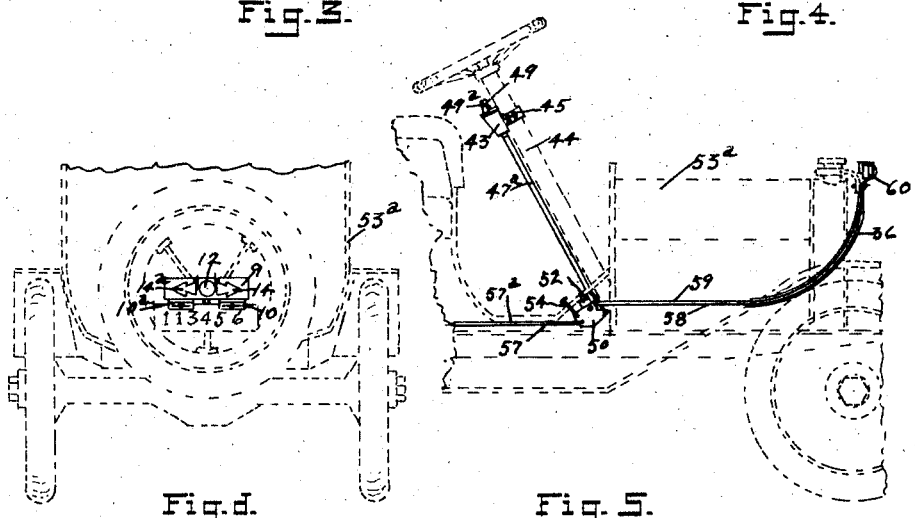
Fig. 5 is a side view of an automobile, showing the operating mechanism attached to the steering post and floor, parts broken away.
Fig. 6 is an end view of an automobile, showing my signal device attached above the license number plate.

My automobile signal device forming the subject-matter of the present invention consists of a casing 1 made of sheet metal, the back portion 2 having end portions $2^a$—$2^b$ divergent toward the front thereof, the inside surfaces 3—$3^a$ of said end portions are painted or coated with a light-reflecting coating, adapted to reflect light toward the front of the casing 1 from a suitable light radiating element 4 placed centrally within the casing and held in place by any suitable means such as soldering.

The casing 1 has a top portion 5 and a bottom portion $5^a$ securely fastened to the back portion 2 and end portions $2^a$—$2^b$ by soldering or other suitable means, or the casing 1 may be pressed out of sheet metal.

The top and bottom portions 5—$5^a$ each have a flange 6—$6^a$ integral therewith and extending the full length of the casing 1.

Screw threaded openings are provided in the flanges 6—$6^a$, adapted to receive machine screws therein as shown at 7—$7^a$—$7^b$—$7^c$.

The end portions $2^a$—$2^b$ each have a flange $6^b$—$6^c$ respectively. These flanges 6—$6^a$—$6^b$—$6^c$ are all in the same plane and parallel with the back portion 2.

In the bottom portion $5^a$ is an oblong opening 8 having a transparent closure $8^a$ fitted thereto and held in place by suitable screws, said opening is for the purpose of permitting light, radiated from the light radiating element 4, to pass through the transparent closure 8ª.

The front portion of the casing 1 is shown at 9, each end of which is provided with a groove formed therein as shown at 9ª—9ᵇ into which the flanges 6ᵇ—6ᶜ slide when assembling the casing. The lower edge of the front portion 9 has brackets as shown at 10—10ª formed integral therewith and offset toward the back a distance sufficient to allow the light transmitted through the oblong opening 8 to pass in front of the vertical portion 10ᵇ of the brackets 10—10ª so that when the casing is fastened above a license number plate by means of said brackets, light will be thrown on the said plate. The horizontal portion 10ᶜ of the brackets 10—10ª serve as stops against which the flange 6ª rests.

Openings in the front portion 9 registering with the screw threaded openings in the flanges 6—6ª permit the machine screws 7—7ª—7ᵇ—7ᶜ to pass through for fastening the casing and front together.

In the center of the front portion 9 is an opening 11 having an outwardly extending flange 11ª into which is removably secured a suitably colored light-diffusing lens 12, held in place by the expanding metal ring 12ª seating against suitable beads in the flange 11ª whereby the light diffusing lens 12 may be removed, giving access to the interior of the casing 1.

On each side of the center opening 11 and between the said opening and each end of the front portion 9 is shown the arrow shaped openings 13—13ª; the opening 13 points to the right and has a green light transmitting element secured therein and serves as night right signal; the opening 13ª points to the left and has a red light transmitting element secured therein and serves as night left signal.

Normally covering these night, right and left signals are the arrow shaped flaps 14—14ª which are hinged to the upper edge of the front portion 9 by suitable hinges 9ᶜ. The outside surface of the arrow shaped flaps 14—14ª are preferably painted to correspond, in color, to the casing 1 to render them practically invisible when closed, the under side of the flaps being painted red and, when exposed, serve as day right and left signals.

The base of the arrow shaped flaps 14—14ª each have a flange or up-turned portion 15 having a slot 15ª with a depression or notch 15ᵇ at the lower end thereof adapted to receive the rollers 16 of the flap actuating arms 17—17ª thereby holding the flaps 14—14ª shut.

A second casing to which the flap actuating arms 17—17ª are hinged is shown at 18, removably secured to the back of the casing 1 by the screws 19. Through the lower side 20 of the casing 18 are two holes, one each side of the vertical center line A—A. A distance above the horizontal center line B—B is a guide member 21 suitably fastened to the casing 18 and having corresponding holes placed in alinement with the holes in the lower side 20. Rods slidable through said holes are shown at 22—23, said rods are each provided with a square shaped shoulder block 24—25 adapted to engage the guide member 21 thus limiting the upward movement of the rods 22—23. Each of these shoulder blocks are provided with a screw threaded hole into which the screw threaded shafts 26—27 are screwed, said shafts being substantially at right angles to the rods 22—23 and extend a distance through the slots 28—29 in the ends of the casing 18 and are adapted to slide therein.

Connecting rods are shown at 30—31 turnably secured to the outer ends of the shafts 26—27 and are pivotedly connected to the lever arms 32—33 of the flap actuating arms 17—17ª whereby the actuating arms will be raised upward when the rods 22—23 are pulled downward. The arrow shaped flaps 14—14ª, being slidably connected to the actuating arms 17—17ª respectively, will also be raised upward into a vertical position, exposing the signals to view. Positioned between the rods 22—23 is a third rod 23ª slidably mounted in alined holes in the lower side 20 of the casing 18 and in the guide member 21 and parallel with the rods 22—23. This rod 23ª also has a square shoulder block 25ª secured thereto adapted to engage the shoulder blocks 24—25.

A coiled spring of sufficient strength is shown at 25ᵇ positioned between the shoulder block 25ª and the lower side 20 of the casing 18 and resiliently holds the rods 22—23—23ª up against the guide member 21. The lower ends of the rods 22—23 are provided with means for attaching thereto suitable draw wires 34—35 thereby furnishing means for operating or pulling down the rods 22—23—23ª at a distance from said casing through a guide tube 36 of suitable size and length.

The lower end of the middle rod 23ª is bent at right angles forming the bell clapper trip 37 which protrudes through a slot 37ª in the covering 38 which is secured to the casing 1 by screws 38ª. The end of the bell clapper trip 37 is beveled off on the upper side as shown at 37ᵇ and is adapted to raise and pass under the bell clapper arm 39 on its upward movement and, on its downward movement, to catch the arm 39 thus pulling the bell clapper 40 a distance away from the bell 41, the arm 39 slipping past the bell clapper trip 37 at a predetermined period, permits the bell clapper 40, by the action of the bell clapper spring 40ª, to strike the bell. The bell clapper arm 39, being turnably secured to the stud 39ª, allows the bell clapper 40 suitable freedom of action. The bell 41 is supported on a post 41ª which is fastened to the casing 18.

It will be seen from the foregoing description that, by the pulling downward of the rod 22 it will carry with it the rod 23ª compressing the spring 25ᵇ and tripping the bell clapper arm 39, rings the bell; the shaft 26, sliding downward in slot 28, pulls the flap actuating arm 17 upward thereby raising the arrow shaped flap 14 to a vertical position exposing the right signals to view, the left signal remaining closed. By pulling down the rod 23 a similar operation takes place, exposing the left signals, and by the pulling downward of both the rods 22—23 simultaneously, both right and left signals are displayed, denoting "stop," the bell 41 ringing at every operation of the flaps and rods.

For operating my signal device from the driver's seat of an automobile, I have provided a plurality of pull chains 42—42ª—42ᵇ supported in a suitable casing 43 which is clamped to the steering post 44 by clamp 45.

The pull chain 42 is connected to the wire 46 which passes through an opening in the link 47. The pull chain 42ª is connected to the wire 46ª which also passes through an opening in the link 47.

A guide tube is shown at 47ª through which the wires 46—46ª slide. The pull chain 42ᵇ is connected to the link 47.

The wires 46—46ª are each provided with a stop as shown at 48—48ª adapted to engage the link 47 when said link is pulled upward by pulling the chain 42ᵇ, thus pulling both of the wires 46—46ª simultaneously for operating both signals at once. Suitable handles or buttons attached to each pull chain are shown at 49—49ª—49ᵇ.

Bell cranks are shown at 50—51 turnably secured to the stanchion 52 by the bolt or shaft 52ª, said stanchion being fastened to the under side of the floor 53 of the automobile 53ª in such a manner that the wires 46—46ª may be attached to the bell crank pins 50ª—51ª respectively whereby said bell cranks may be operated by pulling the pull chains by hand.

Push rods are shown at 54—55 pivotedly connected to the bell cranks 50—51 respectively and which pass up through the floor 53 providing means for operating said bell cranks by pressure of the driver's foot. A coiled spring is shown at 56, positioned between the floor 53 and the bell cranks 50—51 and is adapted to resiliently maintain said bell cranks in a normal position.

Wires are shown at 57—57ª connected to the bell cranks 50—51 respectively by means of crank pins 57ᵇ—57ᶜ. The wire 57 is connected to the wire 34 whereby the rod 22 may be pulled downward for exposing the right signals. The wire 57ª is connected to the wire 35 whereby the rod 23 may be pulled downward for exposing the left signals. Additional wires are shown at 58—59 which are similarly connected to the bell cranks and serve as a means whereby the draw wires of a second signal 60, which may be positioned above the front license number plate, may be operated simultaneously with the rear signal and the signal, the driver of the vehicle, displays may be read from in front of or in the rear of the vehicle.

Having thus described my invention what I claim as new and desire to secure by Letters Patent is:—

1. An automobile signal device of the class described consisting of a casing having its end portions divergent toward the front of the casing, adapted to serve as reflecting surfaces; a light radiating element positioned centrally within the casing; flanges on the front edge of the casing parallel with the back of the casing; a front portion for the casing removably secured to the flanges, said front portion being provided with a centrally located flanged opening and two arrow shaped openings, one on each side of the flanged opening, said arrow shaped openings pointing in opposite directions and having colored light transmitting closures fitted thereto adapted to serve as night right and left signals, said centrally located flanged opening being provided with a colored light diffusing lens removably secured therein; arrow shaped opaque flaps normally covering each arrow shaped opening, said flaps being hinged to the upper edge of the front portion of the casing adapted to serve as day right and left signals; a flange on each arrow shaped flap at right angles to the hinge axis of the flap, each flange being provided with a slot therein and a notch at the lower end of each slot; a roller adapted to engage the notch and to roll back and forth in the slot of each flap; an actuating arm for each flap and to which said rollers are rotatively attached; a second casing secured to the back of the first mentioned casing and to which the actuating arms are hinged; a projection on each actuating arm forming a lever arm whereby, when said lever arms are pulled downward, the arrow shaped flaps will be caused to swing upward exposing the arrow shaped openings to view; a bell mounted on the second mentioned casing and means carried by the second mentioned casing whereby the lever arms may be pulled downward, independently or simultaneously and ring the bell at each operation, substantially as shown and described.

2. An automobile signal device of the class described comprising a casing having its end members diverging toward the front of the casing forming diverging planes adapted to receive a suitable coating or covering of light reflecting material and having an oblong opening in the bottom or floor; a front portion for the casing removably secured thereto and having downwardly and rearwardly extending brackets integral therewith adapted to serve as a means for attaching the casing to a suitable support, said front portion being provided with a centrally located opening; an outwardly extending flange surrounding said opening; a light diffusing lens removably secured in the flange; said front portion also being provided with direction indicating openings positioned one each side of the centrally located opening and pointing in opposite directions; light transmitting colored closures secured to each direction indicating opening; a direction indicating, opaque flap normally covering each direction indicating opening, said flaps being hinged to the upper edge of the front portion; two actuating arms slidably attached, one to each direction indicating flap; a projection on each actuating arm adapted to serve as a lever arm; a second casing secured to the back of the first mentioned casing and to which the actuating arms are hinged, said second mentioned casing being provided with a slot in each end thereof and three holes in the lower side; a horizontally disposed guide member secured to the second mentioned casing and having a plurality of holes in alinement with the holes in the lower side; rods slidable through the alined holes; a shoulder on each outside rod adapted to engage the guide member thereby limiting the sliding movement of the rods; a shaft carried by each outside rod at right angles thereto and working in the slots in the ends of the second mentioned casing; a connecting rod pivoted to the outer end of each shaft and connecting with the projection or lever arm on the actuating arm; a shoulder on the middle rod adapted to engage the shoulders on each outside rod; a coiled spring on the middle rod positioned between the shoulder on the rod and the lower side of the casing adapted to resiliently hold said rods up against the guide member; a bell clapper trip carried by the middle rod; a bell secured to the back of the second mentioned casing, a bell clapper; a bell clapper arm adapted to engage the bell clapper trip; and means carried by the outside rods whereby pull wires may be attached thereto for pulling the rods downward to expose said direction indicating openings and flaps and simultaneously ringing the bell.

3. An automobile signal device of the class described comprising in combination an automobile having a license number plate bracket secured thereto; a casing having its end members divergent toward the front of the casing; a front portion removably secured to the casing, said front portion having a plurality of openings therein; brackets integral with the front portion and extending downward and being offset toward the back of the casing adapted to support the casing in place on the license number bracket of the automobile; opaque flaps hinged to the upper edge of the front portion, one above each opening and normally closing said opening; actuating arms slidably attached, one to each opaque flap; a second casing removably attached to the back of the first mentioned casing and to which the actuating arms are hinged; a projection on each actuating arm adapted to serve as a lever arm; a plurality of rods slidably mounted in the second mentioned casing and means carried by two of the rods whereby the actuating arms may be operated and draw wires attached thereto; a bell secured to the back of the second mentioned casing; a bell clapper adapted to strike the bell; and means carried by the remaining rod for actuating said bell clapper when the draw wires pull the rods downward substantially as shown and described.

In testimony whereof I hereby affix my signature this 7th day of March, 1919.

WILLIAM E. HART.

Copies of this patent may be obtained for five cents each, by addressing the "Commissioner of Patents. Washington, D. C."